Aug. 23, 1966     H. RENNER     3,268,302
SEPARATION OF ZIRCONIUM, HAFNIUM, NIOBIUM AND
TANTALUM, BY INTRODUCING AS A DRY SOLID INTO
THE CENTRAL STEP OF A LIQUID-LIQUID
PARTITION SYSTEM
Filed Sept. 14, 1961
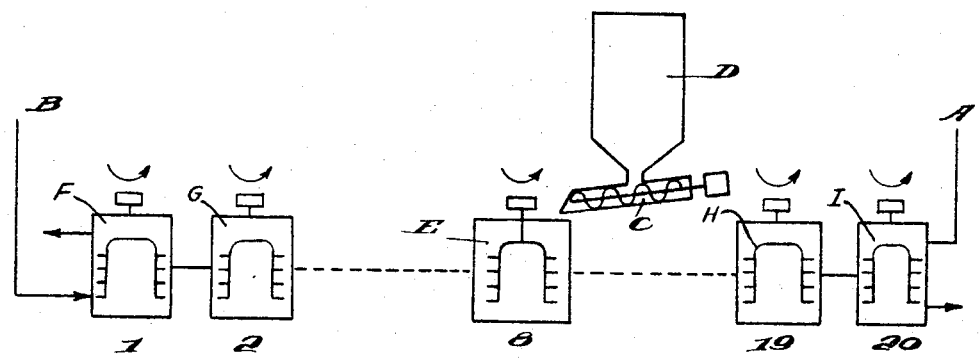
INVENTOR
HERMANN RENNER,
BY *Bailey, Stephens & Huettig*
ATTORNEYS

# United States Patent Office 3,268,302
Patented August 23, 1966

3,268,302
SEPARATION OF ZIRCONIUM, HAFNIUM, NIOBIUM AND TANTALUM, BY INTRODUCING AS A DRY SOLID INTO THE CENTRAL STEP OF A LIQUID-LIQUID PARTITION SYSTEM
Hermann Renner, Konstanz, Germany, assignor to Deutsche Gold- und Silber-Scheideanstalt vormals Roessler, Frankfurt, Germany
Filed Sept. 14, 1961, Ser. No. 138,164
Claims priority, application Germany, Sept. 16, 1960, D 34,267
3 Claims. (Cl. 23—312)

The present invention relates to an improved process for the separation of mixtures of substances and particularly for the separation of zirconium and hafnium compounds by liquid-liquid partition.

In the production of hafnium free zirconium compounds from hafnium containing starting materials upon a commercial scale, liquid-liquid partition, especially of the thiocyanate compounds, has proved more acceptable than other processes. This process has also proved to be of special advantage for the separation of other mixtures of substances.

In the processes practiced technically in which, for example, thiocyanate containing liquid-liquid systems are employed, the Zr/Hf mixture is introduced into about the center of a Van Dyck partition in the form of their thiocyanates and subjected to a liquid-liquid partition. In the ideal instance, the grades of purity of the Zr and Hf obtainable are only dependent upon the partition coefficients of the individual Zr and Hf thiocyanate compounds and the number of partition steps and in principle are unlimited. However, in actual practice it is found that there are limitations in grades of purity which are practically attainable and that such limitations often render it impossible to meet some high purity requirements.

According to the invention it was unexpectedly found that such limitations of the purification effect, within analytically controllable limits, do not occur if instead of the previously customary supply of the mixtures of substances in the form of their aqueous solutions to the partition, such mixtures are supplied in undissolved form directly into one or both of the liquid phases of the liquid-liquid partition system, preferably as pure ionically soluble Zr/Hf tetrachloride or oxychloride.

Detailed investigations have made clear the reasons for the varying results obtained, when solutions of the mixtures to be separated are supplied to the partition system, namely: During the preparation of the aqueous solutions employed to supply the Zr/Hf mixtures and also during storage of such solutions before their supply to the partition system a more or less strong formation of higher polymer compounds of the very hydrolysation sensitive and condensation prone ions and molecules, which originally each only contain one metal ion (for example, $H_2[Zr(SCN)_6]$, $H_2[Hf(SCN)_6]$ and the like) occurs; the high molecular weight adducts which are thus present either cannot take part in the liquid-liquid partition or no longer possess a suited partition coefficient and therefore lead to disturbances in the separation achievable. On the other hand, in the process according to the invention in which the Zr/Hf salt mixture is supplied directly to the liquid phases in the partition system and therefore immediately subjected to the partition insufficient time elapses before the final separation of the Zr and Hf for the formation of adducts which cannot be extracted. Furthermore, in the continuous supply of the solid mixture of salts to partition battery, temperature rises such as occur in the batchwise preparation of aqueous solutions later to be supplied to the partition do not occur as the heat of solution can more easily be removed from all zones of a small partition element than from a larger make-up vessel. A further substantial advantage of supplying the mixture to be separated to the partition system in solid form is that no additional volumes of liquid are introduced thereby into the partition system which would, because of the displacement thereby of the volumetric proportions of the lighter and heavier phases, engender conditions which deviate from those of an ideal Van Dyck partition.

The accompanying drawing schematically shows a liquid-liquid partition system according to the invention.

Such drawing only shows steps 1, 2, 8, 19 and 20 of the 20 individual steps of the partition system. 50 liters per hour of hexone containing thiocyanic acid are supplied at A as the light phase employed in the partition system and 20 liters per hours of an aqueous solution of HSCN is introduced at B as the immiscible heavy phase. The liquids are passed countercurrently to each other through the individual steps. The individual steps consist, for example, of mixing vessels which are combined horizontally into a battery and in which the exchange between the phases is promoted by intensive stirring. Each mixing vessel essentially consists of a mixing space and a settling space, and the transfer of the liquids is effected by the difference in height of the liquid levels. Such exchange batteries are known, such as, for example, the system described in Renner Patent No. 2,980,514. The mixture to be separated, for example, Zr/Hf tetrachloride or oxychloride, is introduced in undissolved state into the middle section of the battery, for example, into step 8. As an intensive stirring occurs in the exchange vessel to effect intimate mixture of the immiscible liquid phases the salt introduced rapidly dissolves in one or the other liquids and thereby is converted into the complex compounds which are partitioned in the desired manner between the two phases. As the dissolution occurs in a relatively large quantity of liquid only compounds are produced which contain only 1 atom of hafnium or 1 atom of zirconium, whereas complex compounds containing a plurality of metal ions which simultaneously contain both Zr and Hf practically are not formed. Also, in view of the relatively large quantity of liquid, practically no heating of the solutions through the heat of solution set free occurs. Furthermore, the introduction of the mixture to be separated in undissolved state avoids introduction of additional quantities of liquid therewith which could cause a displacement of the volumetric proportions of the heavier phase to the lighter phase.

The process according to the invention can similarly be employed for the separation of niobium and tantalum compounds in which a water containing complex former, such as HSCN, is employed as the heavy phase and cyclohexanone containing the complex former is used as the light phase of the partition system. In this instance the niobium/tantalum mixture is introduced into the system as solid niobium-tantalum pentachloride whereby thiocyanate complexes of the metals are formed in a similar fashion as in the case of the Zr/Hf mixtures. In this instance, also, no mixed complex compounds are formed because of the large quantities of liquid available so that the substances to be separated are present in a form completely suitable for extraction.

Similar results can also be obtained when solid rare earth substance mixtures are supplied to the partition system.

The supply of the solid undissolved salt mixtures to step 8 of the partition system, for example, can be effected by a worm conveyor C from a storage container D. The stirrer E in step 8 effects rapid solution of the salt mixtures supplied and stirrers F, G, H and I are suitable means for effecting intensive stirring to promote exchange between the phases in the various steps.

It is also possible to introduce the mixture to be separated in individual portions at such short intervals of time that such discontinuity of supply does not deteriously affect the continuity of the liquid-liquid partition system.

The following example will serve to illustrate the process according to the invention and the advantages thereof.

*Example 1*

Pure solid Zr/Hf tetrachloride was continuously introduced in a centrally located step of a 20 step Van Dyck partition system, as described above, employing aqueous HSCN and hexone containing thiocyanic acid as the immiscible liquids serving for the partition. The extracted aqueous Zr solution leaving one end of the partition system contained only 0.0003% of Hf (3 p.p.m.) based upon the Zr content.

Similar results were obtainable when the Zr/Hf mixture was introduced as the solid oxychloride.

In comparison, when a previously prepared aqueous solution of Zr/Hf tetrachloride or a previously prepared aqueous solution of Zr/Hf oxychloride was employed to introduce the mixture to be separated into the partition system, the other conditions being the same, the aqueous extracted Zr containing solution leaving one end of the partition system still contained 0.012% (120 p.p.m.) and 0.05% (500 p.p.m.), respectively, of Hf based on Zr. It was ascertained that the 120 and 500 p.p.m. of Hf still present were in a form which is not extractable by hexone containing thiocyanic acid.

Furthermore, when a previously prepared solution of Zr/Hf thiocyanate solution was employed to introduce the mixture to be separated into the partition system, the other conditions being the same, the aqueous extracted Zr containing solution still contained 0.024% of Hf based on the Zr which was in a form which is not extractable by hexone containing thiocyanic acid. The Zr/Hf thiocyanate solution was prepared by charging a cation exchanger with a Zr/Hf oxychloride solution and elutriating the cation exchanger with NH₄SCN.

I claim:
1. In a process for the separation of the components of a mixture selected from the group consisting of a mixture of zirconium and hafnium compounds and a mixture of niobium and tantalum compounds, in a continuous, multistep liquid-liquid partition system through which an aqueous phase and a water immiscible organic solvent phase are passed countercurrently and in which the organic solvent phase is enriched with one of said compounds to be separated in dissolved state and the aqueous phase is enriched with another of said compounds to be separated in dissolved state, and in which the immiscible liquid phases of the partition system are intimately stirred in each step, the step which comprises supplying the mixture to be separated in solid dry state, into the stirred liquid phases in a centrally located step in said partition system.

2. The process of claim 1 wherein the phases of the liquid-liquid partition system are aqueous HCSN and hexone containing thiocyanic acid.

3. The process of claim 1 in which the mixture of substances to be separated is Nb/Ta pentachloride and the phases of the liquid-liquid partition system are aqueous HSCN and cyclohexanone containing thiocyanic acid.

References Cited by the Examiner

UNITED STATES PATENTS

| | | |
|---|---|---|
| 2,566,665 | 9/1951 | Huffman et al. _____ 23—24.1 X |
| 2,812,232 | 11/1957 | Delaplaine _____ 23—312 X |
| 2,869,980 | 1/1959 | Grinstead _____ 23—312 |
| 2,906,606 | 9/1959 | Signer _____ 23—270.5 |
| 2,938,769 | 5/1960 | Overholser et al. ____ 23—312 X |
| 2,953,453 | 9/1960 | Foos _____ 75—101 X |
| 3,032,388 | 5/1962 | McCord _____ 23—312 X |
| 3,117,833 | 1/1964 | Pierrot _____ 23—19 |

FOREIGN PATENTS 603,147   8/1960   Canada.

OTHER REFERENCES

Stickney: "Zirconium-Hafnium Separator," Bureau of Mines Report of Investigation 5499 (U.S. Dept. of Interior), 1959, pages 1 to 22.

NORMAN YUDKOFF, *Primary Examiner.*

GEORGE D. MITCHELL, JAMES H. TAYMAN, JR.,
                                    *Examiners.*

S. E. EMERY, *Assistant Examiner.*